(12) United States Patent
Ranellucci (10) Patent No.: US 11,438,146 B1
(45) Date of Patent: Sep. 6, 2022

(54) SYSTEM AND METHOD FOR PERFORMING KEY EXCHANGE WHILE OVERCOMING A MALICIOUS ADVERSARY PARTY

(71) Applicant: Coinbase IL RD Ltd., Oakland, CA (US)

(72) Inventor: Samuel Ranellucci, Tel Aviv (IL)

(73) Assignee: Coinbase IL RD Ltd., Oakland, CA (US)

( * ) Notice: Subject to any disclaimer, the term of this patent is extended or adjusted under 35 U.S.C. 154(b) by 0 days.

(21) Appl. No.: 17/511,856

(22) Filed: Oct. 27, 2021

(51) Int. Cl.
*H04L 9/08* (2006.01)

(52) U.S. Cl.
CPC .......... *H04L 9/0833* (2013.01); *H04L 9/0841* (2013.01)

(58) Field of Classification Search
CPC ......... H04L 9/32; H04L 29/06; H04L 9/0833; H04L 9/0841; H04L 9/28; H04L 9/08; H04L 9/30; H04L 9/0891; H04L 9/3013; H04L 9/302; H04L 63/1441; H04L 9/3247; H04L 9/002; G06F 7/72; G06F 7/60; G06F 7/723; G06F 21/755; G06F 21/602; G06F 21/556; G06Q 20/367; G06Q 20/401
See application file for complete search history.

(56) References Cited

U.S. PATENT DOCUMENTS

| | | | | |
|---|---|---|---|---|
| 6,304,658 | B1 * | 10/2001 | Kocher | G06F 7/723 380/28 |
| 8,345,861 | B2 * | 1/2013 | Schneider | H04L 9/085 380/28 |
| 9,077,539 | B2 * | 7/2015 | Kamara | H04L 9/3218 |
| 9,813,234 | B2 * | 11/2017 | Clark | G06F 21/602 |
| 10,211,980 | B1 * | 2/2019 | Lindell | H04L 9/3093 |
| 10,630,471 | B1 * | 4/2020 | Lindell | H04L 9/0894 |
| 2016/0335440 | A1 * | 11/2016 | Clark | H04L 9/085 |
| 2017/0012948 | A1 * | 1/2017 | Peeters | H04L 9/085 |
| 2017/0272251 | A1 * | 9/2017 | Osheter | H04L 63/062 |
| 2020/0153640 | A1 * | 5/2020 | Ranellucci | H04L 9/3255 |

* cited by examiner

*Primary Examiner* — Samson B Lemma
(74) *Attorney, Agent, or Firm* — Perkins Coie LLP (57) ABSTRACT

A method of performing cryptographic key exchange while overcoming a malicious adversary party using a multi-party computation (MPC) process performed by the multiple parties, where the parties hold initial shares of a secret used an as exponentiation of the key exchange, where the parties do not reveal the initial shares during the entire process, and where arithmetical computations are performed on the initial shares and on random values outputted during MPC processes.

20 Claims, 5 Drawing Sheets

SYSTEM AND METHOD FOR PERFORMING KEY EXCHANGE WHILE OVERCOMING A MALICIOUS ADVERSARY PARTY

FIELD

The invention generally relates to system and method for performing key exchange while overcoming a malicious adversary party.

BACKGROUND

Key exchange (also key establishment) is a method in cryptography by which cryptographic keys are exchanged between two parties, allowing use of a cryptographic algorithm.

If the sender and receiver wish to exchange encrypted messages, each must be equipped to encrypt messages to be sent and decrypt messages received. The nature of the equipping they require depends on the encryption technique they might use. If they use a code, both will require a copy of the same codebook. If they use a cipher, they will need appropriate keys. If the cipher is a symmetric key cipher, both will need a copy of the same key. If it is an asymmetric key cipher with the public/private key property, both will need the other's public key.

Diffie-Hellman key exchange is a method of securely exchanging cryptographic keys over a public channel and was one of the first public-key protocols. Diffie-Hellman is one of the earliest practical examples of public key exchange implemented within the field of cryptography.

The process begins by having the two parties, Alice and Bob, agree on an arbitrary starting value that does not need to be kept secret but should be different every time. Each of the parties also selects a secret value that they keep to themselves—in this case, first secret and a second secret. The crucial part of the process is that both parties mix their own secret value together with their mutually shared value, resulting in two mixed values, and then publicly exchange the two mixed values. Finally, each party mixes its private value and the two mixed values they received from the other party. The result is a final value that is identical to the in both parties.

If an adversarial party listens to the exchange, it would only know the common value and one of the mixed values, but it would be computationally difficult for the adversarial party to determine the final value. In fact, when using large numbers as secret values, this action is computationally expensive. It is impossible to do in a reasonable amount of time even for modern supercomputers. When exchanging keys during evaluation of a garbled circuit, the load on the adversarial party renders the process inefficient in time.

SUMMARY

The invention, in embodiments thereof, discloses a method of performing cryptographic key exchange while overcoming a malicious adversary party, the cryptographic key exchange is performed between multiple parties using a multi-party computation (MPC) process performed by the multiple parties, the method including each party of the multiple parties obtaining an initial share of a secret, the initial shares are used an as exponentiation of the key exchange, performing the following process multiple times performing a first MPC process by the multiple parties, each of the multiple parties receives a share $r_i$ of a random value r, each of the parties computes an arithmetic function using the received share $r_i$ of a random value r, performing a second MPC process, the second MPC process receiving as input the output of the arithmetic function ($G^{r_i}$) as computed by each party, verifying that in at least one of the second MPC processes, the outputs of the arithmetic function ($G^{r_i}$) as computed by each party is correct, performing a third MPC process outputting to the parties a function of the initial shares and the random value r, receiving from the parties an output of an arithmetic function based on the output of the third MPC process, computing the key exchange (G exponentiated by a multiplication of both shares), without the parties revealing the shares to the MPC process, where none of the multiple parties can extract the secret share held by the other party.

In some cases, the verifying correctness of the input of the second MPC process further includes choosing a random value by the MPC process and executing different operations based on the chosen random value, one set of operations from the different operations includes verifying that the initial shares provided by all the multiple parties into the MPC process are correct, and another set of operations from the different operations includes computing the final shares.

In some cases, computing the final shares includes the MPC process generating a plurality of fresh shares based on the initial shares of the secret, each of the multiple parties performing a function on the fresh shares and sending the output of the function to the MPC process, the MPC process generating final shares (FS) based on all the outputs of the functions that received the fresh shares as input.

In some cases, an accumulation of all the final shares equals multiplication of all the outputs of the functions that received the fresh shares as input.

In some cases, the method further includes sending all the fresh shares and all the outputs of functions applied on the fresh shares to all the parties and receiving confirmation from all the multiple parties that the outputs of functions applied on the fresh shares are verified.

In some cases, the method further includes computing an offset value which equals to an output of an offset function minus a random value, sending the offset value to each of the multiple parties, the multiple parties applying a second function on the offset value and sending the output of the function to the MPC process, the MPC process applying the function on the random value used to compute the offset value, the MPC process computing the output of the function on the multiplication of the initial shares based on the output received from the parties and the output of the function on the random value.

In some cases, the method further includes verifying that all parties sent the same value as the output of the second function. In some cases, the method further includes receiving a request to exchange the cryptographic keys between the multiple parties, where the initial shares are cryptographic keys stored in the multiple parties. In some cases, the exchange of cryptographic keys is performed using a Diffie-Hellman process. In some cases, the method further includes the third MPC process outputs shares of (G exponentiated by a multiplication of both shares) each of the multiple parties.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention, in embodiments thereof, discloses a system and method for exchanging keys as part of an MPC process. The MPC process is performed between multiple parties. The multiple parties begin the process when holding shares of a secret, such as a cryptographic key, receive a request to perform a key operation that requires exchanging the shares without revealing the entire secret during the entire process. The parties exchange information, while the heavy computation is performed by the parties, thereby outputting a shared value known to all parties.

The invention, in embodiments thereof, outputs shares of a function applied on the shares held by the parties using garbled circuits without revealing the shares held by the parties. The garbled circuit is evaluated by an MPC process performed in collaboration by the multiple parties. The MPC process is required to perform heavy computations, and the method disclosed below enables the MPC process to compute the output of the function without applying the function on the shares held by the parties.

This method may be used against a malicious adversary, seeking to extract information from the parties and/or damage the process of securing information using the garbled circuit.

The processes performed in embodiments of the invention are relatively inexpensive within a garbled circuit and include arithmetic operations such as Addition and multiplication. The complex processes are performed locally by the parties, in order to reduce the burden on the garbled circuit and reduce the time required to perform the security processes.

Figure 1:
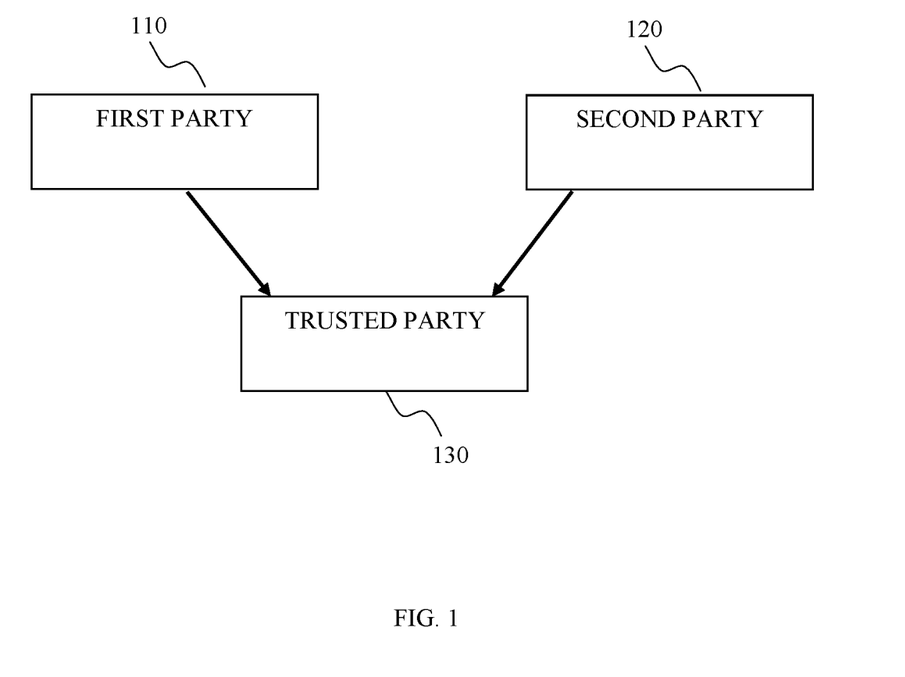
FIG. 1 discloses a computerized environment for performing a key operation as part of a Multi-Party Computation (MPC) process between two parties and a server, according to exemplary embodiments of the invention.

FIG. 1 discloses a computerized environment for performing a key operation as part of a Multi-Party Computation (MPC) process between two parties and a server, according to exemplary embodiments of the invention. The computerized environment includes a first party 110, a second party 120 and a third party 130. The first party 110, a second party 120 may be computerized modules or may be embedded in an electronic device such as a mobile phone, personal computer, laptop, tablet and the like. The process elaborated below may be implemented on a computerized environment having two or more parties, in addition to the third party 130. Each of the first party 110, a second party 120 and a third party 130 include a communication module configured to exchange messages and/or signals between each other. The messages may be of a predefined format. The communication modules of the parties 110, 120 and 130 may enable communication over the internet, such as using an internet gateway, local access network, wide access network and the like. The communication modules may also operate over a non-internet communication channel, for example using wired communication, fiber optics, USB, or wireless communication such as Bluetooth and the like.

Each of the parties 110, 120 and 130 may also have a memory unit, or access to a memory unit located in a remote device working uniquely with a specific party of the parties 110, 120 and 130. The memory unit may be either volatile memory or non-volatile memory. The memory unit may store instructions for performing the process elaborated below. The memory unit may also store the shares of the secret known to each of the parties 110, 120 and 130.

Each of the parties 110, 120 and 130 may also have a processing module configured to manage the part of the process performed in each party. The processing module may be a processor, a CPU, a microprocessor, either implemented in software, hardware or firmware.

Figure 2:
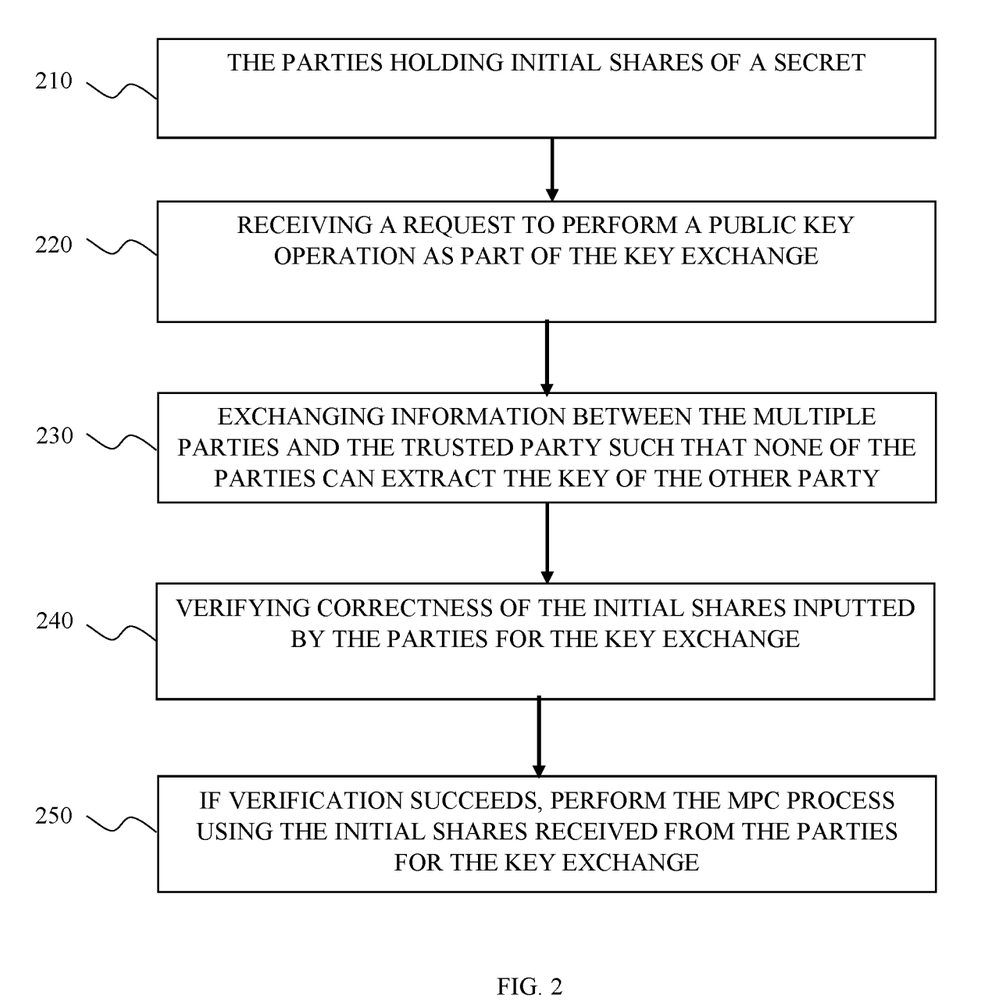
FIG. 2 discloses a method for performing a key operation as part of a Multi-Party Computation (MPC) process between two parties and a server, according to exemplary embodiments of the invention.

FIG. 2 discloses a method for performing a key exchange process as part of a Multi-Party Computation (MPC) process between two parties and a server, according to exemplary embodiments of the invention. Exchanging the keys may include performing a Diffie-Hellman key exchange. The essence of the MPC process is to prevent a single unit from obtaining the entire secret, hence each of the parties which take part in the process of exchanging the secret hold a share of the secret. The MPC process may be implemented in two or more parties, in addition to the third party 130. The third party does not hold a share of the secret.

Step 210 discloses multiple parties holding shares of a secret. The secret may be a cryptographic key. In some cases, each share functions as a cryptographic key. The properties of the shares stored in each of the parties may be identical. That is, if one party holds a cryptographic key and uses the cryptographic key in the key exchange, other parties use the shares they hold that have the same properties, such as size, format and the like.

Step 220 discloses receiving a request to perform a public key operation as part of the key exchange. The request may be received from a third party communicating with one of the multiple parties, outputted from an MPC process, or received from an application operating on one of the multiple parties. The request may be required as part of a process running on another computerized device.

Step 230 discloses exchanging information between the multiple parties and the third party such that none of the parties can extract the key of the other party. The information may be exchanged using a messaging application. The information may be exchanged by sending a message to a communication module to update a value in a predefined memory address in the memory module of the parties. The information is exchanged based on a predefined set of rules stored in the memory of the multiple parties, and in the memory of the third party. The process of exchanging information is elaborated in FIG. 3. The information may be results of mathematical processes and outputs of cryptographic functions and/or operators. The cryptographic functions and/or operators are performed by the multiple parties, while the third party performs the mathematical processes, mainly addition and multiplications, to improve efficiency of the process, as the third party is required to perform additional processes in addition to the exchange of cryptographic keys, such as generating a garbled circuit.

Step 240 discloses verifying correctness of the key shares inputted by the parties for the key exchange. The correctness of the shares inputted by the parties is performed by choosing a random value by one of the multiple parties of as output of an MPC process. The chosen random value determines which operations are performed by the parties. One set of operations from the different operations involves verifying that the shares provided by all the parties are correct, and another set of operations from the different operations involves computing the final shares.

Step 250 discloses each party holding a final share outputted from a mathematical operation performed on the initial shares held by the parties in step 210. The mathematical operation may be multiplication. The final shares (FS) may be additive shares of the result of the mathematical operation. For example, given there are three parties, holding initial shares $S_1$, $S_2$ and $S_3$, the output of the process is final shares $FS_1$, $FS_2$, $FS_3$, such that $FS_1+FS_2+FS_3$ equals $S_1+S_2+S_3$.

Figure 3:
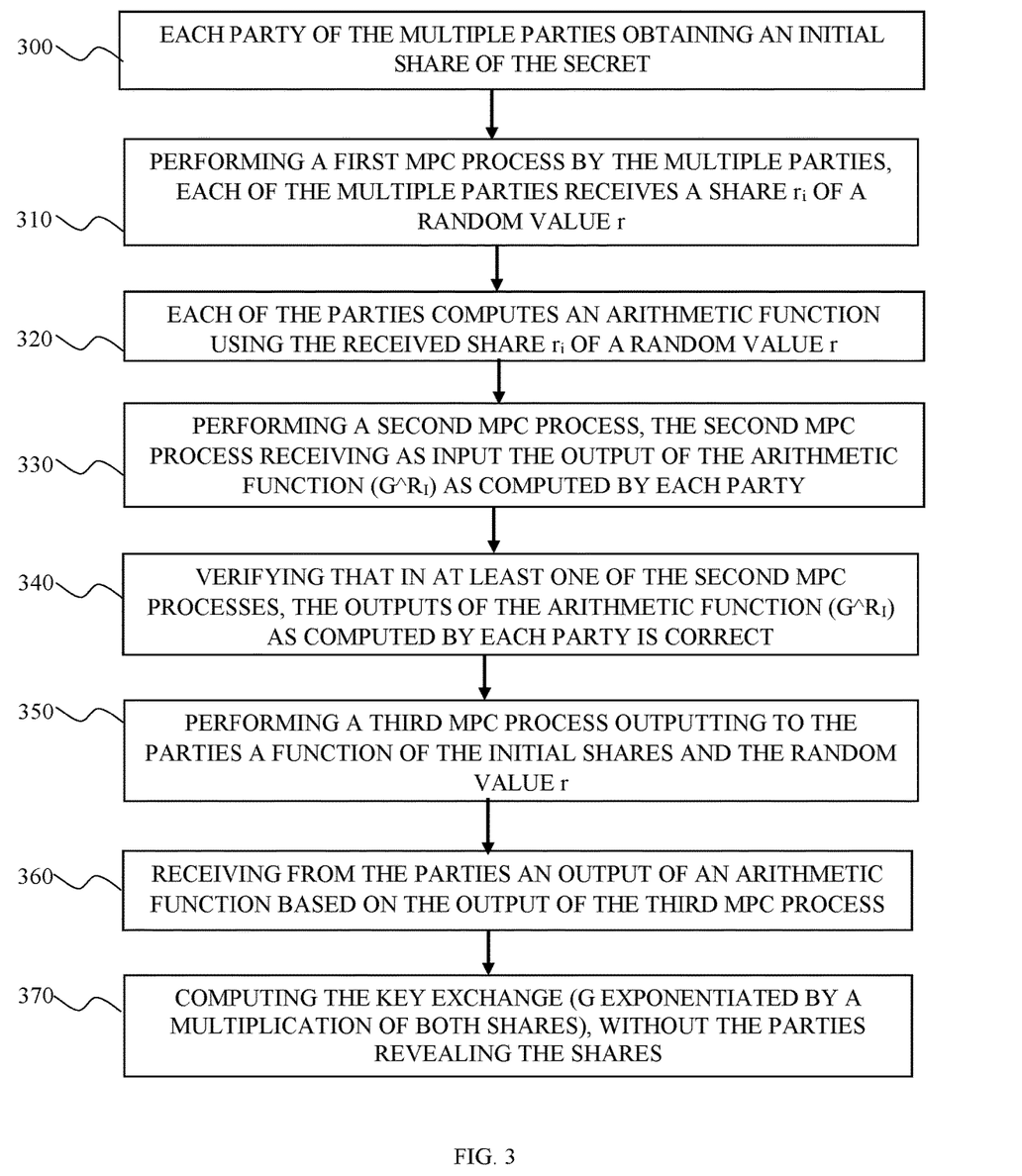
FIG. 3 discloses a method of performing key exchange while overcoming a malicious adversary party, according to exemplary embodiments of the invention; and, FIGS. 4A and 4B, taken together, disclose a method of computing the multiplication of the initial shares while verifying the correctness of the values provided by each party of the multiple parties, according to exemplary embodiments of the invention.

FIG. 3 discloses a method of performing key exchange while overcoming a malicious adversary party, according to exemplary embodiments of the invention.

Step 300 discloses each party of the multiple parties obtaining an initial share of the secret. All the initial shares, when used together, can be used as the secret. It is a functional requirement of the method that no party of the multiple parties has access to all the initial shares of the secret throughout the entire method.

Step 310 discloses performing a first MPC process by the multiple parties, each of the multiple parties receives a share $r_i$ of a random value r. The parties lack access to the share held by the other parties during the entire process. Sending the shares $r_i$ of a random value r may be performed by sending a message over the internet, via a wired cable or via a cellular modem. The shares $r_i$ of a random value r may be stored in a predefined memory address in the memory of the parties.

Step 320 discloses each of the parties computes an arithmetic function using the received share $r_i$ of a random value r. When outputting the shares of r, none of the parties reveal the share it received from the MPC process. The arithmetic function may be to compute a known G to the power of the share $r_i$ (also defined as $G^{\wedge}r_i$), as G may be defined as a generator of an ECDSA process.

Step 330 discloses performing a second MPC process in which each party inputs the computed value of the arithmetic function. The process of generating the shares of the random value R and the second MPC process in which the parties provide the value g to the power of the share of r is done multiple times, to verify, at least one time, in a very high probability, that the values provided by the parties are true, even in case half of the parties may be adversary.

Figure 4A:
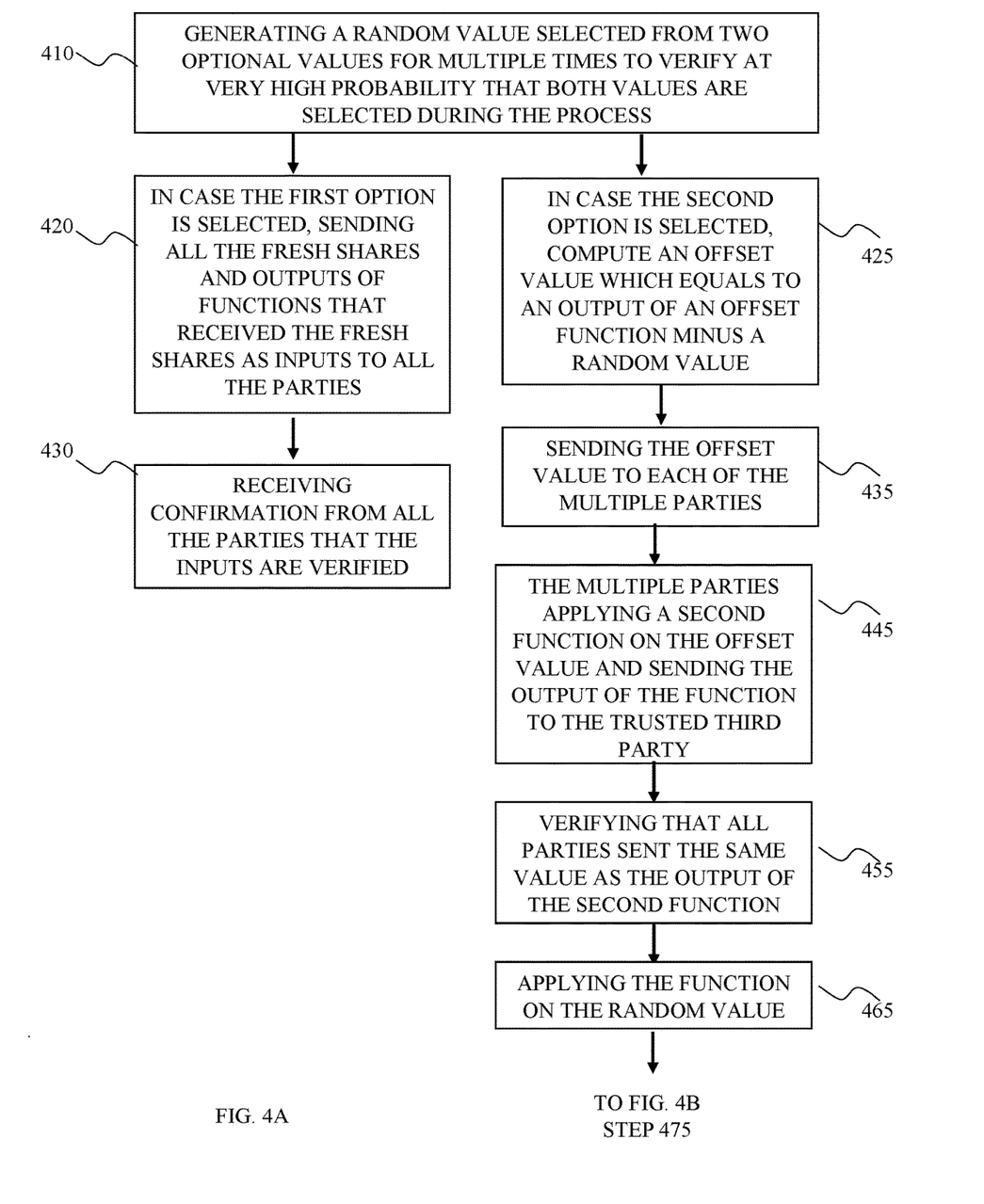
Figure 4B:
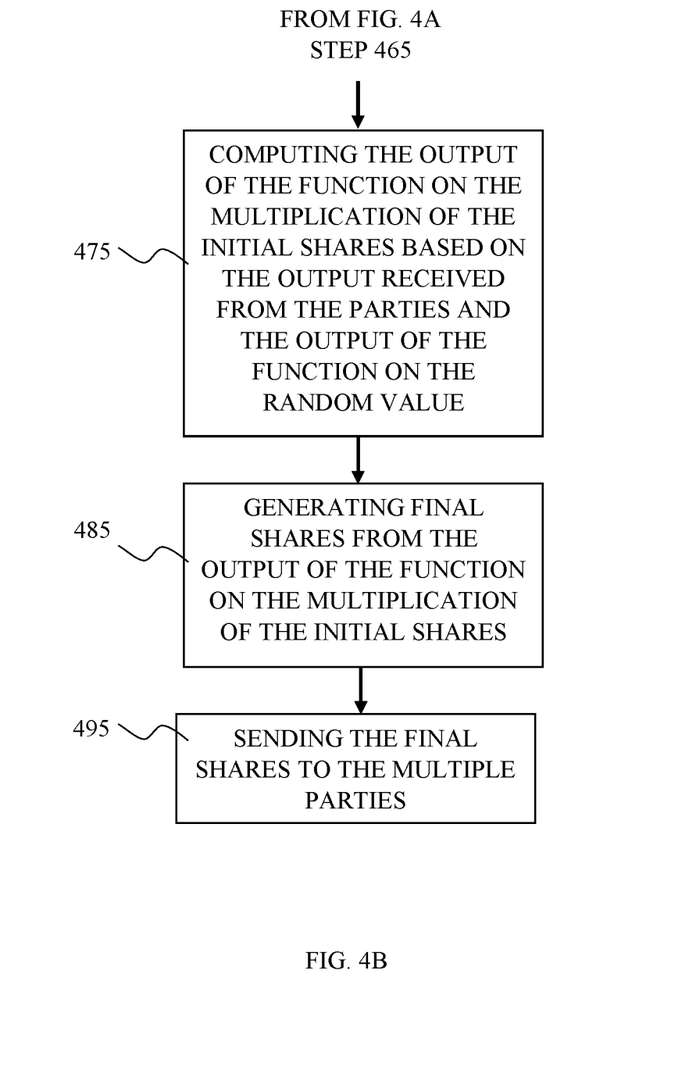

Step 340 discloses verifying that in at least one of the second MPC processes, the outputs of the arithmetic function ($g^{\wedge}r_i$) as computed by each party is correct. this process is described in detail in FIG. 4. This process is performed each time the first MPC process and the second MPC process are performed.

Step 350 discloses performing a third MPC process outputting to the parties a function of the initial shares and the random value r. The function may be a multiplication of the initial shares minus or plus the random value r (also defined as x*y+r). The parties do not have access to the random value received by each party.

Step 360 discloses receiving from the parties an output of an arithmetic function based on the output of the third MPC process. The arithmetic function may be exponentiation of G to the power of the value received in the third MPC process. The function used here may be identical to the function used in step 320. The values computed by the parties are sent to the MPC process. For example, Party P1 sends $G^{\wedge}(X*Y+R)$ and party P2 sends $G^{\wedge}(X*Y+R)$. This way, the MPC process compares the values provided by the parties to verify correctness. The MPC process then compute $G^{\wedge}XY$ without the parties revealing X and Y, the initial shares, and verifying correctness of values provided by the parties.

Step 370 discloses computing the key exchange (g exponentiated by a multiplication of both shares), without the parties revealing the shares.

The MPC Process may provide shares of the key exchange ($G^{\wedge}xy$) to the parties. Each party of the multiple parties receives another final share, such that all the final shares can later be used during an MPC process performed by the parties. Sending the shares of the key exchange may be performed by sending a message over the internet, via a wired cable or via a cellular modem. The shares of the key exchange may be stored in a predefined memory address in the memory of the parties.

FIGS. 4A and 4B, taken together, disclose a method of computing the multiplication of the initial shares while verifying the correctness of the values provided by each party of the multiple parties, according to exemplary embodiments of the invention.

Step 410 discloses generating a random value selected from two optional values for multiple times to verify at very high probability that both values are selected during the process. The random value may be generated by a random function operating in the MPC Process. The random value may be selected at least 5 times, to ensure at a probability of 96% that both options are selected and executed, as elaborated below. The malicious adversary has to guess the random value in order to damage the process of outputting the shares of the function's output. Selecting the random value multiple times increases the probability that the malicious adversary fails to guess the random value at least once.

When the first option is selected, steps 420 and 430 are executed, in cooperation with the multiple parties, to verify that the values provided by each of the multiple parties is correct and can be used to compute the multiplication of the initial shares. When the second option is selected, the MPC Process computes the multiplication of the initial shares, in cooperation with the multiple parties. The MPC Process performs the simple mathematical operations, mainly addition, subtraction and multiplication, while the multiple parties execute cryptographic functions, to reduce the resources required by the MPC Process and reduce the time required to perform the entire process.

Step 420 discloses sending all the fresh shares and all the outputs of functions applied on the fresh shares to all the parties. This process is performed when the first option is selected randomly in step 410. The fresh shares are random values generated by the MPC Process based on the initial shares provided by the multiple parties. As disclosed in step 330, the MPC Process sends each of the fresh shares to each party of the multiple parties. Then, each party of the multiple parties applies a function that receives as input the fresh share. In some cases, all the multiple parties apply the same function. Then, each party of the multiple parties sends the output of the function to the MPC Process. Sending all the fresh shares and all the outputs of functions may be performed by sending a message over the internet, via a wired cable or via a cellular modem. The fresh shares and all the outputs of functions may be stored in a predefined memory address in the memory of multiple parties.

Step 430 discloses receiving confirmation from all the multiple parties that the outputs of functions applied on the fresh shares are verified. As each of the multiple parties receives the outputs of the functions and the inputs of the functions, the parties perform the functions and verify that the output as received from the MPC Process matches the input, which is the fresh share, also received from the MPC Process. This way, the MPC Process verifies that all the parties provided a valid value.

Step 425 discloses computing an offset value which equals to an output of an offset function minus a random value. The offset function may be the multiplication of the initial shares or any other function that receives the initial shares as input and performs an arithmetic or mathematic operation on the initial shares X and Y. This process is performed when the second option is selected randomly in step 410. The random value may be equal to the accumulated sum of all the initial shares. The offset value may equal to the formula of X*Y−Ri, as Ri is generated each time the random value is generated in step 410, and X and Y denote all the initial shares provided by each of the multiple parties. The general representation of the offset value is F(X, Y)−Ri, as F is the offset function and X and Y are the initial shares.

Step 435 discloses sending the offset value to each of the multiple parties. Sending the offset value may be performed by sending a message over the internet, via a wired cable or via a cellular modem. The offset value may be stored in a predefined memory address in the memory of multiple parties.

Step 445 discloses the multiple parties applying a second function on the offset value and sending the output of the function to the MPC Process. The second function may be identical for all the parties of the multiple parties. Sending the output of the second function may be performed by sending a message over the internet, via a wired cable or via a cellular modem. The output of the second function may be stored in a predefined memory address in the memory of multiple parties.

Step 455 discloses verifying that all parties sent the same value as the output of the second function. This verification is executed by comparing the multiple outputs of the second function as received from each party of the multiple parties and verifying that all the multiple outputs are equal.

Step 465 discloses applying the function on the random value used to compute the offset value. This process is performed by the MPC Process, to prevent a case in which any party of the multiple parties holds the initial shares.

Step 475 discloses computing the output of the function on the multiplication of the initial shares based on the output received from the parties and the output of the function on the random value. The function F is required to hold a property of F(a)+F(b)=F (a+b). Thus, when computing the function on the offset value and computing the function on the random value, the MPC Process holds the output of the function on the multiplication of the initial shares.

Step 485 discloses generating final shares from the output of the function on the multiplication of the initial shares. Step 495 discloses sending the final shares to the multiple parties. Sending the final shares may be performed by sending a message over the internet, via a wired cable or via a cellular modem. The final shares may be stored in a predefined memory address in the memory of multiple parties.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed invention not be limited to the particular embodiments disclosed herein.

What is claimed is:

1. A method of securely exchanging messages, over the Internet, between users with mobile devices through a messaging application by performing cryptographic key exchange while overcoming a malicious adversary party, said cryptographic key exchange is performed between multiple parties using a multi-party computation (MPC) process performed by the multiple parties, said method comprising:
  obtaining, by each of the multiple parties, on a respective mobile device, an initial share of a secret, wherein the initial shares are used as an exponentiation of the key exchange;
  performing, using a respective messaging application on the respective mobile device of each of the multiple parties in order to exchange a message, multiple times:
    a first MPC process by the multiple parties, wherein each of the multiple parties receives a share n of a random value r;
    a computation by each of the parties of an arithmetic function using the received share n of a random value r;
    a second MPC process, wherein the second MPC process receives as input the output of the arithmetic function (G^ri) as computed by each party;
    a verification that in at least one of the second MPC processes, the outputs of the arithmetic function (G^ri) as computed by each party is correct;
  performing a third MPC process outputting to the each of the multiple parties a function of the initial shares and the random value r;
  receiving from the each of the multiple parties an output of an arithmetic function based on the output of the third MPC process;
  computing, the key exchange (G exponentiated by a multiplication of both shares), without the parties revealing the shares to the MPC process;
  wherein none of the multiple parties can extract the secret share held by any other party.

2. The method of claim 1, wherein the verifying correctness of the input of the second MPC process further comprising choosing a random value by the MPC process and executing different operations based on the chosen random value, one set of operations from the different operations comprises verifying that the initial shares provided by all the multiple parties into the MPC process are correct, and another set of operations from the different operations comprises computing the final shares.

3. The method of claim 2, wherein computing the final shares comprises:
  generating a plurality of fresh shares based on the initial shares of the secret;

each of the multiple parties performing, by each of the multiple parties, a function on the fresh shares and sending the output of the function to the MPC process;

generating final shares (FS) based on all the outputs of the functions that received the fresh shares as input.

4. The method of claim 3, wherein an accumulation of all the final shares equals multiplication of all the outputs of the functions that received the fresh shares as input.

5. The method of claim 3, further comprising sending all the fresh shares and all the outputs of functions applied on the fresh shares to each of the multiple parties and receiving confirmation from all the multiple parties that the outputs of functions applied on the fresh shares are verified.

6. The method of claim 3, further comprising:
computing an offset value which equals to an output of an offset function minus a random value;
sending the offset value to each of the multiple parties;
applying, by each of the multiple parties, a second function on the offset value and sending the output of the function to the MPC process;
applying the function on the random value used to compute the offset value;
computing the output of the function on the multiplication of the initial shares based on the output received from the parties and the output of the function on the random value.

7. The method of claim 6, further comprising verifying that each of the multiple parties sent the same value as the output of the second function.

8. The method of claim 1, further comprising receiving a request to exchange the cryptographic keys between the multiple parties, wherein the initial shares are cryptographic keys stored in the multiple parties.

9. The method of claim 1, wherein the exchange of cryptographic keys is performed using a Diffie-Hellman process.

10. The method of claim 1, further comprising the third MPC process outputs shares of (G exponentiated by a multiplication of both shares) each of the multiple parties.

11. A system of for securely exchanging messages, over the Internet, between users with mobile devices through a messaging application by performing cryptographic key exchange while overcoming a malicious adversary party, said cryptographic key exchange is performed between multiple parties using a multi-party computation (MPC) process performed by the multiple parties, said system comprising one or more processor comprising instructions stored in a memory that cause operations comprising:
obtaining, by each of the multiple parties, on a respective mobile device, an initial share of a secret, wherein the initial shares are used as an exponentiation of the key exchange;
performing, using a respective messaging application on the respective mobile device of each of the multiple parties in order to exchange a message, multiple times: a first MPC process by the multiple parties, wherein each of the multiple parties receives a share n of a random value r; a computation by each of the parties of an arithmetic function using the received share n of a random value r; a second MPC process, wherein the second MPC process receives as input the output of the arithmetic function (G^ri) as computed by each party; a verification that in at least one of the second MPC processes, the outputs of the arithmetic function (G^ri) as computed by each party is correct; performing a third MPC process outputting to the each of the multiple parties a function of the initial shares and the random value r; receiving from the each of the multiple parties an output of an arithmetic function based on the output of the third MPC process; computing, the key exchange (G exponentiated by a multiplication of both shares), without the parties revealing the shares to the MPC process; wherein none of the multiple parties can extract the secret share held by any other party.

12. The system of claim 11, wherein the verifying correctness of the input of the second MPC process further comprising choosing a random value by the MPC process and executing different operations based on the chosen random value, one set of operations from the different operations comprises verifying that the initial shares provided by all the multiple parties into the MPC process are correct, and another set of operations from the different operations comprises computing the final shares.

13. The system of claim 12, wherein computing the final shares comprises:
generating a plurality of fresh shares based on the initial shares of the secret;
each of the multiple parties performing, by each of the multiple parties, a function on the fresh shares and sending the output of the function to the MPC process;
generating final shares (FS) based on all the outputs of the functions that received the fresh shares as input.

14. The system of claim 13, wherein an accumulation of all the final shares equals multiplication of all the outputs of the functions that received the fresh shares as input.

15. The system of claim 13, further comprising sending all the fresh shares and all the outputs of functions applied on the fresh shares to each of the multiple parties and receiving confirmation from all the multiple parties that the outputs of functions applied on the fresh shares are verified.

16. The system of claim 13, wherein the instructions further cause operations comprising:
computing an offset value which equals to an output of an offset function minus a random value;
sending the offset value to each of the multiple parties;
applying, by each of the multiple parties, a second function on the offset value and sending the output of the function to the MPC process;
applying the function on the random value used to compute the offset value;
computing the output of the function on the multiplication of the initial shares based on the output received from the parties and the output of the function on the random value.

17. The system of claim 16, further comprising verifying that each of the multiple parties sent the same value as the output of the second function.

18. The system of claim 11, wherein the instructions further cause operations comprising receiving a request to exchange the cryptographic keys between the multiple parties, wherein the initial shares are cryptographic keys stored in the multiple parties.

19. The system of claim 11, wherein the exchange of cryptographic keys is performed using a Diffie-Hellman process.

20. The system of claim 11, wherein the instructions further cause operations comprising the third MPC process outputs shares of (G exponentiated by a multiplication of both shares) each of the multiple parties.

* * * * *